United States Patent [19]

Chertok et al.

[11] 4,426,192
[45] Jan. 17, 1984

[54] METHOD AND APPARATUS FOR CONTROLLING WINDMILL BLADE PITCH

[75] Inventors: Allan Chertok, Bedford; Joel Donahue, Woburn; William Widnall, Lexington, all of Mass.

[73] Assignee: U.S. Windpower, Inc., Burlington, Mass.

[21] Appl. No.: 464,726

[22] Filed: Feb. 7, 1983

[51] Int. Cl.³ .................................................. F03D 7/04
[52] U.S. Cl. ......................................... 416/1; 416/41; 416/11
[58] Field of Search ................. 416/1, 41 A, 37, 31, 416/44 A, 50 A, 51 A, 52 A, 53, 11, 43 A

[56] References Cited

U.S. PATENT DOCUMENTS

| | | | |
|---|---|---|---|
| 4,193,005 | 3/1980 | Kos | 416/41 A X |
| 4,297,076 | 10/1981 | Donham | 416/37 |
| 4,329,117 | 5/1982 | Doman | 416/41 A X |
| 4,339,666 | 7/1982 | Patrick et al. | 416/41 A X |
| 4,348,154 | 9/1982 | Ducker | 416/43 |

Primary Examiner—Everette A. Powell, Jr.
Attorney, Agent, or Firm—Cesari and McKenna

[57] ABSTRACT

In order to control the turbine speed of a windmill employed for power generation, the pitch of the turbine blades is based on a dual-deadband control strategy. If the current turbine speed is determined to be outside of a relatively wide deadband, action is taken to correct the speed by changing blade pitch accordingly. If the current speed is not outside of the relatively wide deadband, then the average of the turbine speed over a recent interval is compared with a relatively narrow deadband within the wider deadband. Action is then taken to change the blade pitch if the average speed is outside the narrow deadband. In this way, wide excursions of turbine speed are corrected promptly, but the frequency of control actions is minimized by requiring only the average speed to be kept within tight limits.

24 Claims, 6 Drawing Figures

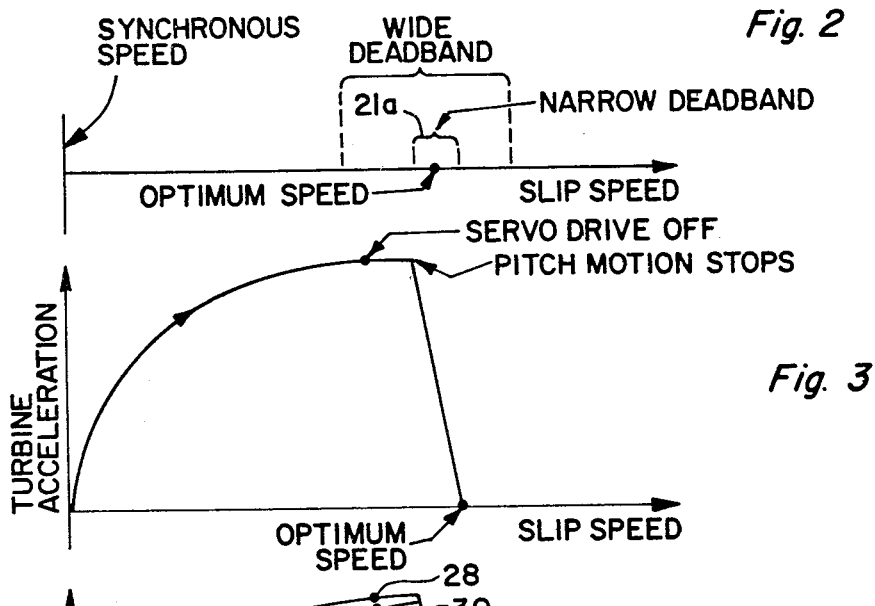
Fig. 2
Fig. 3
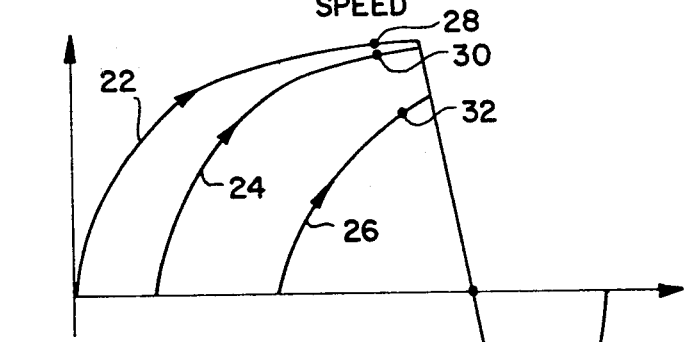
Fig. 4
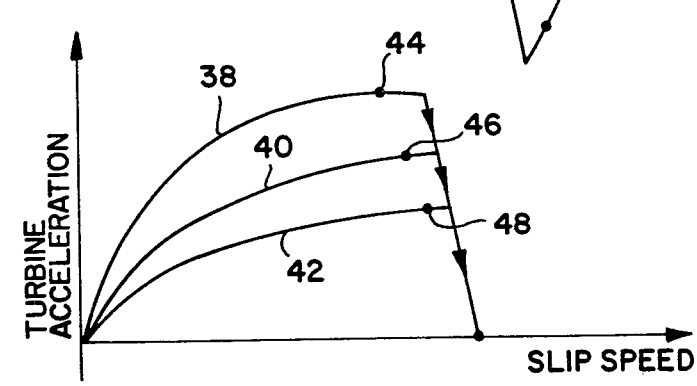
Fig. 5

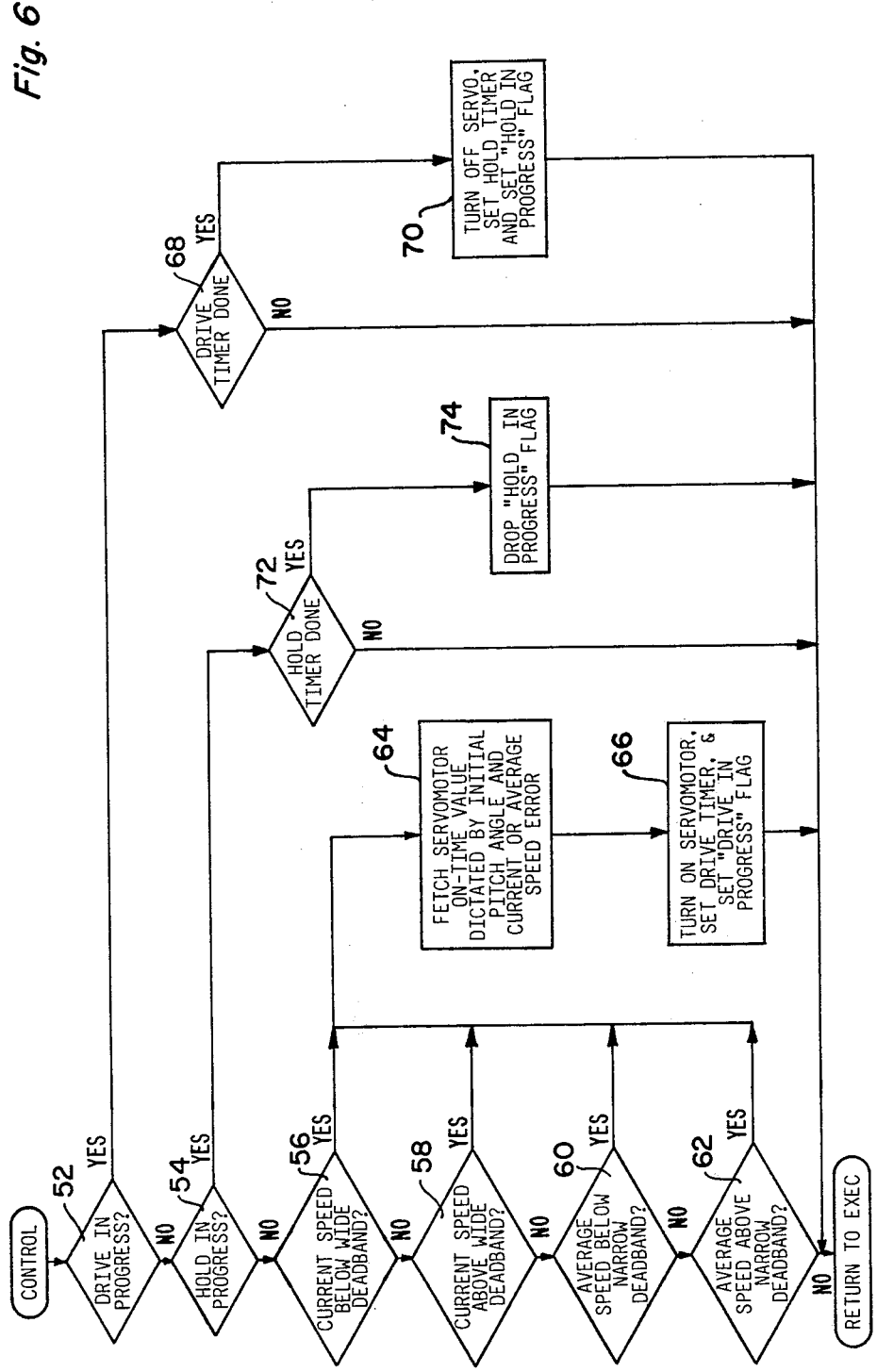

METHOD AND APPARATUS FOR CONTROLLING WINDMILL BLADE PITCH

BACKGROUND OF THE INVENTION

The present invention relates to windmill control, and it is concerned particularly with control of the pitch angle of the windmill's turbine blades during operation.

The power that a windmill-driven generator produces increases with wind speed, and so does the wind force experienced by the windmill. High wind speeds can cause the generator to exceed its rated power level and thus damage the generator. Other windmill parts are also subject to damage or excessive fatigue when the wind force is too high. This is true not only of windmills used for power generation but also of windmills used, for example, to pump water. So there must be some way to control the wind force experienced by the windmill. One way is to control blade pitch.

In the case of a windmill driving an induction generator, for instance, the speed of windmill rotation must be least great enough to provide some "slip" between the generator rotation and the phase advance of the voltage on the power grid. As the speed increases, so does the power generation, but excessive speed can overheat the generator or mechanically strain the windmill, causing damage or premature wear. Too little speed, on the other hand, results in inefficient use of the system. Therefore, it is important to control the speed of the turbine by adjusting the pitch of its blades.

Although it is desirable to keep the turbine speed exactly at the optimum power-generation level, to do so would require very frequent pitch changes and result in excessive pitch-control-mechanism wear. It is accordingly an object of the present invention to control windmill output power accurately while avoiding excessive wear.

SUMMARY OF THE INVENTION

We have found that when an error is detected between the desired speed and the measured speed, it often happens that no control action is really necessary; the error is often due to momentary gusts, and the windmill speed thus returns to the desired level by itself. Specifically, if the error is small, no action is necessary unless the error lasts for an extended period. To call in the control system in such a situation would thus cause unnecassary wear on the control system.

But it is not possible to know whether the speed excursion will shortly return to the intended region or will continue for an unacceptable period. Furthermore, wide upward speed excursions are intolerable for all but the briefest of periods, so it is important that they be remedied promptly. So the goals of optimum speed, reliability and efficient control are not entirely consistent.

One version of our system uses two deadband speed regions. A speed sensor generates a speed signal, and a control circuit that receives the speed signal determines whether the speed is outside of a relatively wide deadband. If it is, then the control circuit commands a blade-pitch actuator mechanism to adjust the blade pitch accordingly. If the current speed as sensed by the speed sensor is not outside the wide deadband, the control circuit then determines whether the average turbine speed over a predetermined interval is outside a narrower deadband that is within the wider deadband. If it is not, then again no control action is taken. If it is, the control circuit causes the blade-pitch actuator to adjust the blade pitch appropriately. The same principle can also be applied when control outputs other than speed are sensed.

According to another aspect of our invention, the control circuit determines the actuator drive time required to effect enough pitch-angle change to correct a power deviation. The drive time is determined as a function of turbine speed error. The control system can also include a pitch-angle sensor and can determine the drive time as a function of pitch angle as well.

The invention is more specifically defined in the appended claims.

BRIEF DESCRIPTION OF THE DRAWINGS

These and further features and advantages of the present invention are described in connection with the accompanying drawings, in which:

FIG. 2 is diagram of the deadbands used in the control system of the present invention;

FIG. 3 is a phase-plane plot of a control action taken in response to a turbine-speed error;

FIG. 4 is a diagram similar to FIG. 3 showing several initial values of slip speed;

FIG. 5 is a diagram similar to FIGS. 3 and 4 but illustrating trajectories having the same initial slip speed but different initial blade pitches; and FIG. 6 is a simplified flow chart of a routine employed by the microprocessor of the illustrated embodiment to calculate the application of command signals to the actuator of the control system.

DETAILED DESCRIPTION OF THE PREFERRED EMBODIMENT

Figure 1:
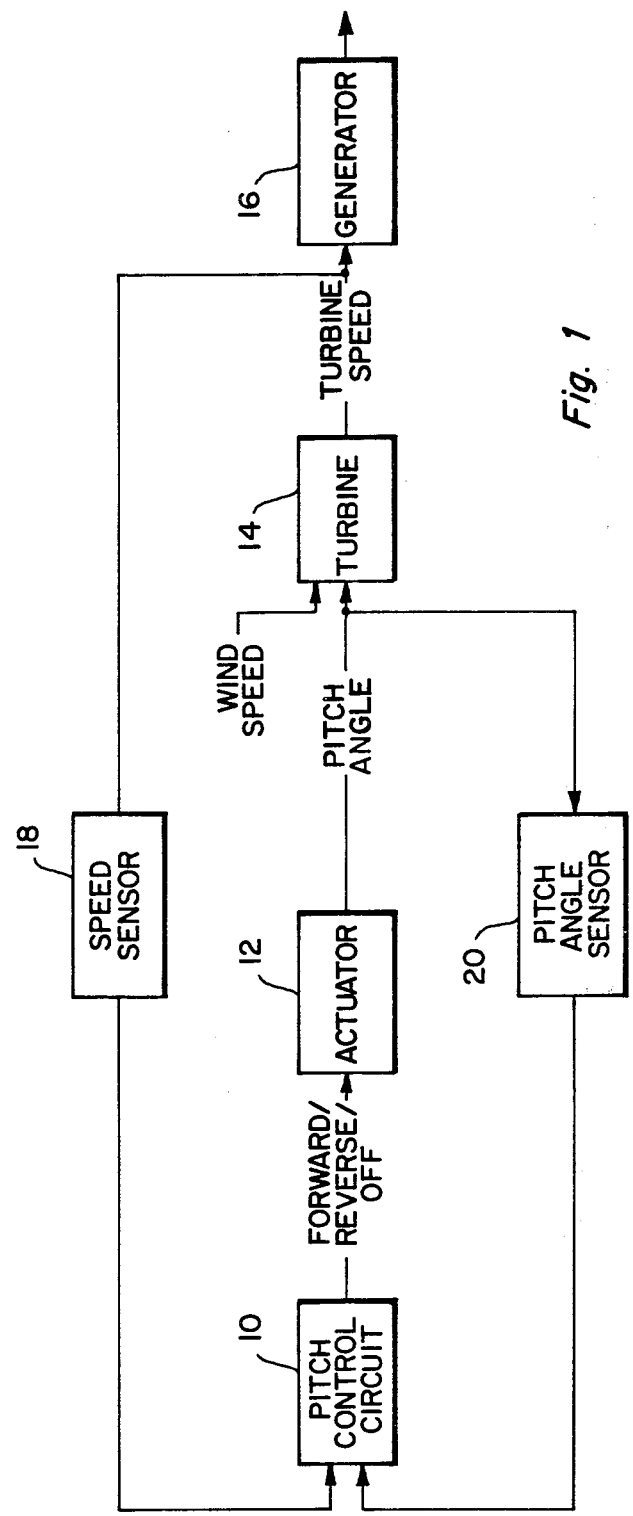
FIG. 1 is a block diagram of a control system employing the teachings of the present invention.

FIG. 1 is a block diagram depicting the general form of a control system for controlling the turbine speed of a windmill used for electric power generation. A pitch-control circuit 10 to be described in more detail below generates command signals and applies them to an actuator 12, which adjusts the pitch angle of the blades of the windmill turbine 14. In general, an increased pitch results in a decreased speed of the turbine 14 for a given wind speed, while a reduction in blade pitch results in a higher turbine speed. The pitch-control circuit 10 thereby controls turbine speed, and thus the speed of a generator 16 driven by the turbine, by varying the pitch angle of the turbine blades.

The actuator 12 may be of the type illustrated in more detail in U.S. patent application Ser. No. 282,965, filed July 13, 1981, by Allan Chertok, et al. for WIND-POWER SYSTEM, which is hereby incorporated by reference.

In brief, the actuator of the Chertok application includes a servomotor for rotating an actuating nut that threadedly engages an actuating rod. The rod is mounted in the interior of the turbine shaft to rotate with the turbine shaft but slide axially along it. As a consequence, the actuating rod moves axially if there is relative rotation between the nut and the turbine shaft. The actuating rod is linked to the blades to cause a pitch change when it moves axially.

Ordinarily, a clutch keeps the actuating nut rotating at the same speed as the shaft and rod, so the pitch of the turbine blades remains constant. Upon a command from the pitch-control circuit 10, however, the clutch is disengaged, and the servomotor rotates the nut in one direction or the other relative to the turbine rotation to increase or decrease the pitch of the turbine blades. In the illustrated embodiment, the servomotor is commanded only to run in two states, forward and reverse; the speed of the servomotor is not dependent on pitch angle, and the duration of its operation depends only on initial pitch angle and turbine speed, not on changes in these variables that occur during servomotor operation.

The pitch-control circuit 10 is preferably a microprocessor-based circuit that keeps track of the rotational speed of the turbine 14 by means of a speed sensor 18. The speed sensor includes a tachometer that generates pulses at a frequency proportional to the rotational speed of the turbine shaft. It also includes a counter for counting these pulses. The number of pulses counted in a given time interval is thus proportional to the speed of the turbine.

The control system also includes a pitch-angle transducer 20 that provides signals representing the current pitch angle of the turbine blades. One type of pitch-angle sensor includes a potentiometer operated by the turbine-blade actuating rod. The potentiometer output is applied to a voltage-controlled oscillator whose frequency is thereby a measure of the blade angle. Specifically, the number of oscillator output pulses generated during a given interval is an indication of the pitch angle.

Control of turbine speed in accordance with the broader teachings of the present invention can be accomplished without the use of the pitch-angle sensor; it is possible to sense only turbine speed and to increase or decrease the blade pitch if the speed is too high or too low, respectively. As the following description will explain, however, the information derived from the pitch-angle sensor is instrumental in achieving efficient control of turbine speed.

It should also be pointed out at this point that the invention is concerned mainly with the control methods using for the range of turbine speeds and pitch angles that result when the wind speed is high enough to drive the turbine at an optimum rotational speed for which the system has been designed. When the wind speed is not that high, the control of blade pitch is carried out in a manner different from that which will be described below, specifically in a manner described in U.S. patent application Ser. No. 282,965.

According to the present invention, the pitch-control circuit determines whether or not to apply command signals to the actuator 12 by comparing the current turbine speed with a wide speed deadband that brackets a predetermined optimum speed and also by comparing the average speed over a predetermined interval with a narrower deadband. As a result, the control system keeps the average speed of the turbine within narrow limits that provide maximum output power while avoiding premature fatigue failure; it ignores short-term excursions outside this range unless they are so large as to be potentially damaging or to cause unacceptable drops in efficiency. In other words, the effective bandwidth of the system is narrow when it is dealing with small excursions but wider when large excursions occur. The control system is thus a dual-bandwidth/dual-deadband system.

The difference between the terms current speed and average speed, as applied to the illustrated embodiment, is not entirely qualitative. Both speeds are average speeds in a sense since the distinction between the two is the amount of time over which the tachometer pulses are accumulated. (The integration time for "current speed" may be 100 msec., while that for the average speed may be 3200 msec.) Nonetheless, the "current speed" is used by the microprocessor as though it were an instantaneous speed, while the average speed is intended as an average per se.

The dual-deadband scheme is illustrated in FIG. 2, in which the deadbands are plotted on a slip-speed axis. The slip speed is the difference between the turbine speed and the speed at which the turbine would be rotating if it were driving the generator in synchronism with the grid voltage—i.e., it is the difference between the turbine speed and the speed at which the generator neither generates power nor receives power from the power grid. The speed designated as optimum in FIG. 2 is the speed at which the generator generates as high a power as is possible without excessive system strain. The narrow deadband 21a is the region to which the pitch-control circuit 10 keeps the average turbine speed, while the wide deadband 21b is the range of current-speed values that the pitch-control circuit will allow.

Those speeds between the upper ends of the two deadbands are the speeds that would cause excessive wear to the system if they were allowed to continue over long periods, but they are relatively inconsequential if they occur only for short durations. The speeds between the lower ends of the two deadbands represent power outputs that are too low to be tolerated on a long-term basis but not so low as to require operating the blade-pitch actuator while the average speed is within the narrow deadband.

The upper end of the wider deadband is the beginning of a speed region in which the danger of damage to the system becomes significant, even for short-term excursions. It is thus important to adjust the speed of the turbine promptly whenever this region is reached.

The lower end of the wide deadband can be set in consideration of various factors. It will typically be a value that is reached infrequently enough so that undue wear to the control system is not caused by driving the system back to the optimum speed whenever this limit is reached. That is, this value will typically represent a compromise between power-generation efficiency and control-system wear.

After the decision is made to call for action from the actuator, the actuator is operated in a way that further contributes to the efficiency of the system. The system typically includes considerable lags, both in detecting power deviations and in effecting corrective pitch changes. These result from the moment of inertia of the turbine and from delays in the control system. Therefore, it would not be effective merely to keep changing the blade pitch until the proper speed is sensed. If the controller has much gain, it would be difficult to avoid overshooting the desired speed. On the other hand, more-sluggish control detracts from efficiency and, in addition, can prevent prompt response to potentially damaging wind gusts.

The addition of rate information to remedy the system lags—that is, continuously controlling the servomotor drive in accordance with both turbine speed error and turbine acceleration—is problematic. The periodic components of the force that the windmill experiences make the acceleration signal inherently noisy. In addition, in view of the nonlinearitites of the system to be controlled, an effective control function of turbine speed and acceleration would be very complicated.

Accordingly, the pitch-control circuit 10 of the present invention turns on the actuator 12 for a time that is a predetermined function of turbine-speed error and initial blade pitch. More specifically, when the pitch-control circuit 10 determines that it is necessary to command the servomotor of the actuator 12 to rotate the actuating nut that adjusts the turbine pitch, it determines an optimum drive time for the servomotor that is a function of the present pitch angle and either the current or average turbine speed. The duration of servomotor actuation is then set; it is not dependent on values of system variables sensed later, while the actuator is operating.

The advantage of this type of control can be appreciated by reference to FIGS. 3–5.

FIG. 3 is a phase-plane plot whose axes represent slip speed and its first derivative, turbine acceleration. Although the foregoing description, as well as the description that follows, describes the invention in terms of slip speed, it should be recognized that slip speed is only an example of a windmill control output. Other control outputs, such as torque, power, phase angle, or other quantities of interest, could be used instead. The initial portion of the plot shows the trajectory taken, for given initial conditions of slip speed and pitch angle, when the servomotor for changing blade pitch is turned on. The starting point of the plot reflects the assumption that the slip speed is relatively constant at the beginning of the control operation—i.e., that turbine acceleration is zero—and there is a further assumption that wind speed is constant during servomotor operation and the resultant approach of the turbine speed to its optimum value subsequent settling.

These assumptions apply to all of the phase-plane plots of FIGS. 3, 4, and 5. It will be recognized, of course, that actual trajectories will often differ from those in the drawings because these assumed conditions are not encountered consistently in practice. However, the durations for actuator operation set by the control system are based on steady-state conditions, so the use of these assumptions in describing the system is appropriate.

At the beginning of the trajectory of FIG. 3, there is a slip-speed error shown as the distance between the initial position and the optimum speed. The pitch-control circuit 10 detects this error and, in response, turns on the servomotor. The blade pitch therefore begins to decrease. With the decrease in blade pitch, the force of the wind on the turbine is increased, and the turbine accordingly begins to accelerate, as the rising curve indicates. Of course, the acceleration is accompanied by an increase in turbine speed, which is represented by the inclination of the curve toward the right. In the example shown in FIG. 3, the acceleration quickly reaches a plateau, which represents the steady rate of speed increase that accompanies a steady decrease in blade pitch. (In actuality, the amount of speed increase for a given pitch decrease varies with the initial pitch angle, but this effect is not apparent in FIG. 3.)

There is a point in the trajectory that, given the assumptions mentioned above, is the optimum point at which to turn off the servomotor. At that point, turning off the servomotor will allow the system to "coast" to the optimum speed. If the servomotor is turned off before this point, the turbine will not reach the optimum speed. If the servomotor is turned off later, the optimum speed will be overshot. This point is indicated in FIG. 3 by the legend servo drive off. The pitch-control circuit turns the servomotor off at this point because a time period determined by the pitch-control circuit from the initial values of blade pitch and turbine speed has ended.

As the phase-plane plot indicates, the acceleration of the turbine does not immediately begin to decrease. The reason is that there is some lag between the removal of the drive command from the servomotor and the termination of the pitch adjustment. When the change in blade pitch does stop, at a time represented in FIG. 3 by the legend pitch motion stops, turbine acceleration still continues, because there is a delay between the blade-pitch change and the resulting change in slip speed. As the straight-line portion of the trajectory indicates, turbine acceleration decreases when the pitch motion stops, and the slip speed approaches the optimum speed exponentially after the blade pitch stops changing.

The representation of system behavior given by FIG. 3 is simplified, but it does show some of the considerations that go into achieving proper control. One such consideration is the lag between the removal of the servomotor command and the termination of acceleration. Clearly, if the servomotor had not stopped until the optimum speed had been reached, the lag in the system would have carried the slip speed beyond the intended optimum.

The phase-plane plot also indicates the advisability of having a rest interval after the removal of the command signal from the servomotor so that samplings of slip speed taken during this interval are not relied upon as current speed values for determining whether or not to command another actuator operation. In FIG. 3, for instance, an error remains for a time after the servo drive is removed, but the slip speed asymptotically approaches the optimum speed without any further control. Sampling during this period, with resultant servomotor operation, would drive the slip speed beyond the optimum. For this reason, the programming of the pitch-control circuit includes a provision for a rest time during which the application of control signals is inhibited.

The servomotor drive time will in general be different for different initial errors. This is illustrated in FIG. 4, which shows differing initial errors and the optimum control trajectories that might result. Plot 22 represents a relatively large error as an initial condition, while plots 24 and 26 represent intermediate and smaller initial errors, respectively. Each plot includes its respective servomotor turn-off point 28, 30, or 32, and it is apparent after a little reflection that the time taken to reach the servomotor off point 32 is less than that required to reach servomotor off point 28; if the error is less, it takes less time to correct it.

FIG. 4 also shows a further trajectory 34. This is an example of a trajectory for an initial slip speed that is higher than the optimum. The shape of the curve differs somewhat from the general shapes of the other curves because the pitch servosystem can reduce blade pitch faster than it can increase it, but the same result is apparent: the servomotor drive time depends on the initial error.

FIG. 5 illustrates that the servomotor drive times differ for different values of initial pitch angle, too. This is because the control effectiveness of pitch varies with pitch angle. More specifically, the first partial derivative of slip speed with respect to pitch angle is a function of pitch angle. In other words, the pitch-angle change required to achieve a given slip-speed change varies with the initial value of the pitch angle.

Plots 38, 40 and 42 of FIG. 5 represent different optimum trajectories for which the initial speed errors are the same but the initial angles are different. Like FIGS. 3 and 4, FIG. 5 illustrates general characteristics; it is not intended to be quantitatively accurate. Plot 38 represents an initial pitch angle at which control effectiveness is high; i.e., the slip-speed change for a given change in blade pitch is relatively high. As a consequence, the pitch-change drive time represented by trajectory 38 is relatively short.

Trajectory 40 represents an intermediate value of control effectiveness and thus an intermediate value of drive time to achieve the optimum speed, while the low control effectiveness represented by trajectory 42 results in a more gradual approach to the optimum speed. Accordingly, the turn-off times 44, 46, and 48 for trajectories 38, 40 and 42 are reached at different time intervals after the servomotor is turned on.

In the preferred embodiment of the present invention, the pitch-control circuit includes a look-up table organized according to slip-speed error and blade pitch. It contains entries of servomotor drive time. When it is determined that control action must be taken, the drive-time entry is fetched from the location specified by the pitch angle and the current or average slip-speed error, and the actuator is operated accordingly.

The look-up-table entries can be determined experimentally or by resort to a mathematical model of the system. In the alternative, the entries can be determined adaptively by the pitch-control circuit 10 in accordance with experience so that changes due to wear, age, and other factors can be accommodated. No such adaptive arrangement is illustrated here, but the entries are stored in a protected portion of a read-write memory so that they can be rewritten from an external source if changes appear necessary.

A simplified flow chart illustrating the control routine performed by the pitch-control circuit 10 is depicted in FIG. 6. The various functions depicted in FIG. 6 are arranged for ease of description, and they do not slavishly follow the segregation into executive program and subroutines that practical considerations might dictate.

The pitch control circuit 10 is based on an executive program that services two groups of routines. The first group supervises sensors, frequency-measuring counters, and control timers. This group is serviced whenever a real-time clock included in the system interrupts the processor. The interrupt interval is long enough to insure that this group of routines is completed well before the next interrupt. The remaining time is used to service a second group of routines. One of these is a control routine, and it is illustrated in FIG. 6. It uses sensor-input and timer-status data reported by the routines of the first group.

Upon entry into the control routine, the processor initially determines whether the actuator 12 is currently in the process of driving the turbine blades to a different pitch angle. This determination is represented in FIG. 6 by a decision block 52. If no drive is in progress, the routine checks to see if the system is still in a rest period after the last actuation, as block 54 indicates. If not, the current speed is tested, as blocks 56 and 58 indicate, to determine whether it is outside the wide deadband. If not, the average speed is checked, as blocks 60 and 62 indicate. If neither the current nor the average speed is outside its designated deadband, the control routine returns control to the executive program.

If the current or average speed is outside its limits, on the other hand, the control routine consults its look-up table, as block 64 indicates, to find the value of servomotor drive time dictated by the initial pitch angle and either the current- or the average-speed error. The control routine then proceeds to the steps represented by block 66; it turns on the servomotor, sets a drive timer with the drive-time value fetched in the step represented by block 64, and sets a "drive in progress" flag, which is the flag tested during the step represented by block 52. The control routine then returns control to the executive program.

On the next call of the control program, the test represented by block 52 finds that the "drive in progress" flag is set. Accordingly, the routine branches to a test represented in FIG. 6 by block 68. In this test, the processor checks to determine whether the drive timer, which was set in the step represented by block 66, has timed out. If it has not, control is returned to the executive program. If it has, the microprocessor turns off the actuator 12, as block 70 indicates, and it sets a hold timer, which begins to time the rest period that must be observed after servomotor actuation terminates. A "hold in progress" flag is then set, and the routine returns control to the executive program.

When the microprocessor next calls the control routine, the test represented by block 52 indicates that a drive is no longer in progress, so the routine checks the "hold in progress" flag that was set in the step represented by block 70. It finds that this flag has been set, so it checks to see whether the hold timer has timed out. This test is represented in FIG. 6 by decision block 72. During the first pass through the control routine after the "hold in progress" flag has been set, the hold timer typically has not timed out, and the control routine returns control to the executive program. On some subsequent pass through the routine, however, the rest time will have ended, and the test represented by block 72 will result in an affirmative determination. When it does, the routine resets the "hold in progress" flag, as block 74 indicates, and returns control to the executive program. The system is then ready to test the current or average speed when the control routine is next called.

It is apparent that numerous refinements to the illustrated embodiment can be made. As was mentioned before, the times represented by the look-up-table values can be adjusted under program control in accordance with experience. Specifically, the look-up-table values can represent blade-pitch changes that are fixed for given initial conditions, but the servomotor drive times employed to achieve the pitch change can be varied based on previous observations of the response of blade pitch to servomotor operation.

Alternatively, provision can be made for closed-loop execution of blade-pitch changes specified by the table. In this case, a routine would turn on the servomotor until the desired pitch change is indicated by the pitch sensor. According to phase-plane principles described above, such a system might turn off the drive somewhat before the desired position is detected to allow for turn-off lag and coasting.

Additionally, various deadband limits can be set adaptively. As an example, the program may keep track of how many excursions of average or current speed outside their respective deadbands occur within a predetermined period, and if there have been no such excursions or very few, the deadband widths can be tightened to increase generator productivity without significantly increasing the number of actuator operations. Also, a formula can be included in the program, or the look-up table can be expanded, to include the value of the initial turbine acceleration in the calculation of the drive time or rest time.

Even the "optimum speed" can be set adaptively. For example, it might be desirable to fix the value of the upper wide-deadband limit and adjust the optimum speed based on the frequency with which the upper wide-deadband limit is exceeded. One way of doing this is to increase the optimum speed periodically but decrease it whenever the upper wide-deadband limit is exceeded. Such an arrangement would lower the target for the average speed during gusty conditions and thus keep the frequency of high-power excursions within acceptable bounds.

The teachings of the present invention can be used in simpler control systems, also. As an example, the value of initial blade pitch can be left out of the drive-time calculations. Such a system would control in a less efficient fashion, of course, but it would still have the basic benefit of the invention, namely, that of responding promptly to wide excursions of turbine speed but avoiding excessive control actuations by keeping only the average speed within the tighter deadband limits.

Although the control output monitored in the illustrated embodiment is slip speed, the broader teachings of the present invention can also be employed by monitoring other control outputs. In the illustrated arrangement, the output ultimately of interest is power, and this is sensed indirectly as turbine speed. In the alternative, power can be sensed by sensing the torque output of the windmill. In this instance, output power is roughly proportional to output torque because the slip speed of an induction generator typically is not much more than 2% of the synchronous speed. If the teachings of the present invention were employed in a system for driving a synchronous generator rather than an induction generator, the use of output torque as the sensed variable would be particularly appropriate, since turbine speed would not be an indication of output power. Sensing of the phase difference between the generator and the power grid can also be used in synchronous-generator installations. In the alternative, output power can be measured directly by electric-power sensors.

Also, as was indicated above, the teachings of the present invention are not restricted to windmills used for electric power generation. In a pumping system, for instance, the output of interest might still be power—in this case, mechanical power—but output speed or torque may also be the variables of interest.

Whatever control output is sensed, the basic teachings of the present invention remain the same. That is, the average control output is caused to remain within a narrow deadband, but the current control output is only required to stay within a wider deadband.

Accordingly, the teachings of the present invention can be followed in a wide range of control systems to achieve a high level of windmill productivity with a relatively low frequency of actuator operation.

What is claimed is:

1. A windmill control system for controlling a windmill that includes a turbine having turbine blades and a blade-pitch actuator for varying the pitch of the turbine blades in response to pitch-command signals applied thereto, said control system comprising:

A. a control output sensor for sensing a windmill control output and generating an output signal representative of the sensed control output; and B. a control circuit for generating pitch-command signals, said control circuit being electrically connected to said blade-pitch actuator for transmission of the command signals to it, said control circuit further being electrically connected to said control-output sensor for reception of output signals therefrom and for deriving from the output signals a current control output and an average of the control output over a predetermined averaging interval, said control circuit sending command signals to said blade-pitch actuator to command pitch-angle changes in response to current and average control output, throughout at least a range of control outputs, only if the current control output is outside a predetermined wide deadband or the average control output is outside a predetermined narrow deadband included within the wide deadband, said control system thereby responding promptly to control-output excursions outside the wide deadband but acting to bring the control output within the narrow deadband only when the average control output falls outside the narrow deadband.

2. A control system as recited in claim 1 wherein said control circuit sends no command signals to said actuator based on a current control output determined from output signals received within a predetermined rest time after a previous blade-pitch-actuator operation.

3. A control system as recited in claim 2 wherein:
A. the control output sensed by said control-output sensor is turbine speed; and
B. said output signal generated by said control-output sensor is a speed signal representative of the sensed turbine speed.

4. A control system as recited in claim 1 wherein:
A. the control output sensed by said control-output sensor is turbine speed; and
B. said output signal generated by said control-output sensor is a speed signal representative of the sensed turbine speed.

5. A control system as recited in claim 1 wherein said control circuit determines an actuator drive time as a function of the control output before each actuator operation and then commands operation of the blade-pitch actuator for a time duration equal to the determined actuator drive time.

6. A control system as recited in claim 5 wherein said control circuit sends no command signals to said actuator based on a current control output determined from output signals received within a predetermined rest time after a previous blade-pitch-actuator operation.

7. A control system as recited in claim 6 wherein:
A. the control output sensed by said control-output sensor is turbine speed; and
B. said output signal generated by said control-output sensor is a speed signal representative of the sensed turbine speed.

8. A control system as recited in claim 5 wherein:
A. the control output sensed by said control-output sensor is turbine speed; and
B. said output signal generated by said control-output sensor is a speed signal representative of the sensed turbine speed.

9. A control system as recited in claim 5 wherein:

A. said control system further includes a pitch-angle sensor for sensing the pitch angle of the turbine blades and for transmitting to said control circuit a pitch signal indicative of the pitch angle; and B. said control circuit determines the actuator drive time as a function also of the pitch of said turbine blades as sensed before operation of the blade-pitch actuator.

10. A control system as recited in claim 9 wherein said control circuit sends no command signals to said actuator based on a current control output determined from output signals received within a predetermined rest time after a previous blade-pitch-actuator operation.

11. A control system as recited in claim 10 wherein:
A. the control output sensed by said control-output sensor is turbine speed; and
B. said output signal generated by said control-output sensor is a speed signal representative of the sensed turbine speed.

12. A control system as recited in claim 9 wherein:
A. the control output sensed by said control-output sensor is turbine speed; and
B. said output signal generated by said control-output sensor is a speed signal representative of the sensed turbine speed.

13. A method of controlling the output of a windmill that includes a turbine having variable-pitch turbine blades, said method comprising the steps of:
A. sensing a control output;
B. if the sensed control output is outside a predetermined relatively wide deadband, changing the blade pitch in one direction if the current control output is above the wide deadband and changing the blade pitch in the other direction if the current control output is below the wide deadband;
C. determining the average of the control output over a predetermined averaging interval; and
D. if the average control output is outside a predetermined relatively narrow deadband within the relatively wide deadband, changing the blade pitch in one direction if the average control output is above the narrow deadband and changing the blade pitch in the other direction if the average control output is below the narrow deadband.

14. A method of controlling windmill output as recited in claim 13 wherein the control output sensed and controlled is turbine speed.

15. A method of controlling windmill output as recited in claim 13 wherein the control output is sensed only after the blade pitch has been constant for a predetermined settling time.

16. A method of controlling windmill output as recited in claim 15 wherein the control output sensed and controlled is turbine speed.

17. A method of controlling windmill output as recited in claim 13 wherein the amount of change in blade pitch in step (B) is a function of the current control output and wherein the amount of change in blade pitch in step (D) is a function of average control output.

18. A method of controlling windmill output as recited in claim 17 wherein the control output sensed and controlled is turbine speed.

19. A method of controlling windmill output as recited in claim 17 wherein the control output is sensed only after the blade pitch has been constant for a predetermined settling time.

20. A method of controlling windmill output as recited in claim 19 wherein the control output sensed and controlled is turbine speed.

21. A method of controlling windmill output as recited in claim 17 wherein:
A. said method further includes the step of sensing the pitch of the turbine blades; and
B. the amount of change in blade pitch is also a function of sensed blade pitch.

22. A method of controlling windmill output as recited in claim 21 wherein the control output sensed and controlled is turbine speed.

23. A method of controlling windmill output as recited in claim 21 wherein the control output is sensed only after the blade pitch has been constant for a predetermined settling time.

24. A method of controlling windmill output as recited in claim 23 wherein the control output sensed and controlled is turbine speed.

* * * * *